Aug. 20, 1968　　J. M. VALDESPINO　　3,397,789
SEWAGE TREATMENT SYSTEM

Original Filed Nov. 8, 1963　　5 Sheets-Sheet 1

INVENTOR
JOE M. VALDESPINO

BY *[signature]*
ATTORNEY

Aug. 20, 1968
J. M. VALDESPINO
3,397,789
SEWAGE TREATMENT SYSTEM
Original Filed Nov. 8, 1963
5 Sheets-Sheet 2
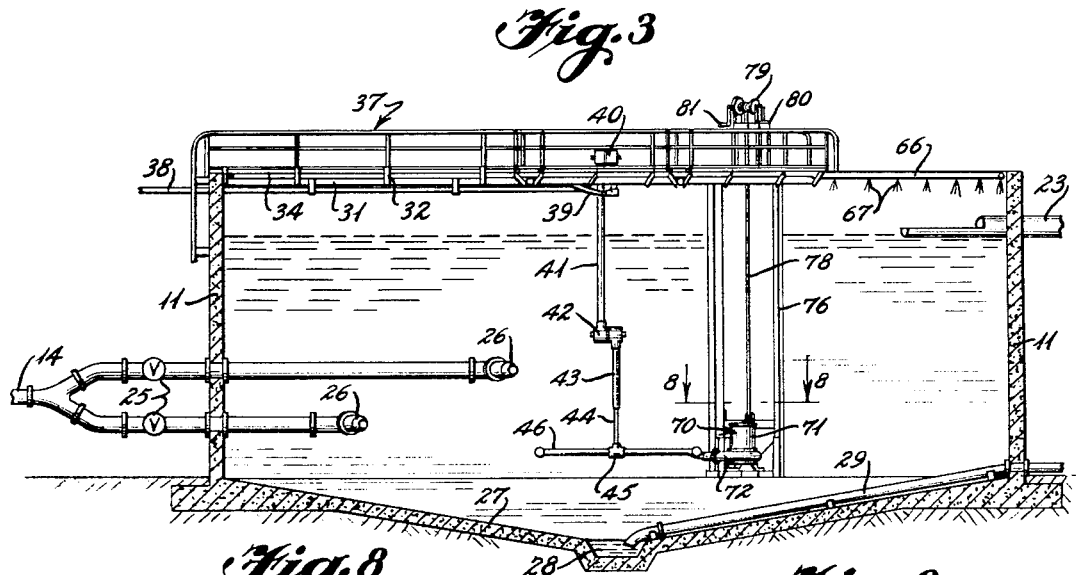
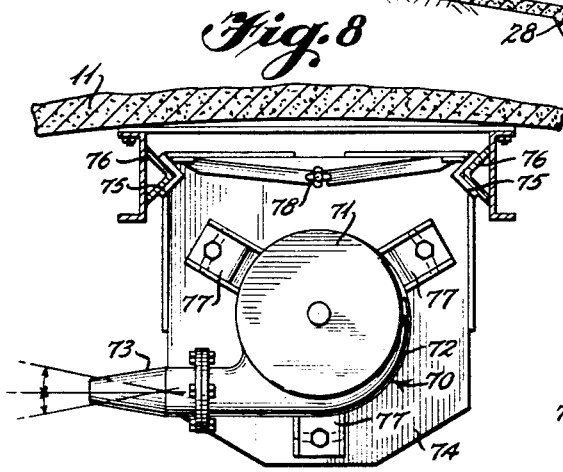
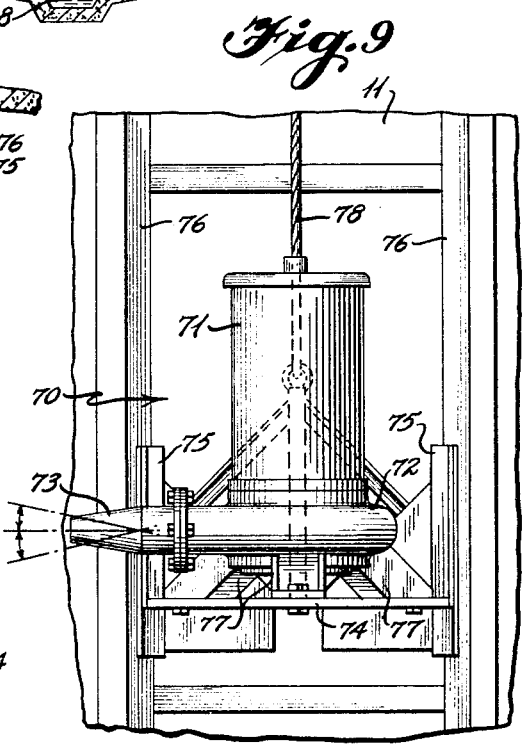
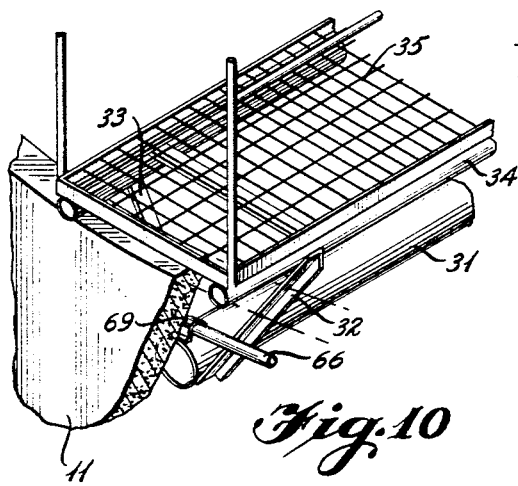
INVENTOR
JOE M. VALDESPINO
BY
ATTORNEY

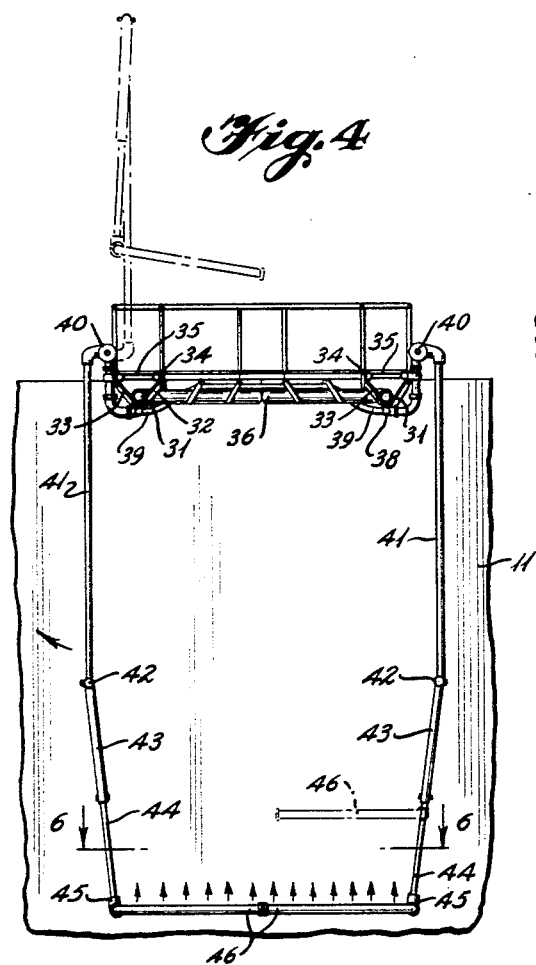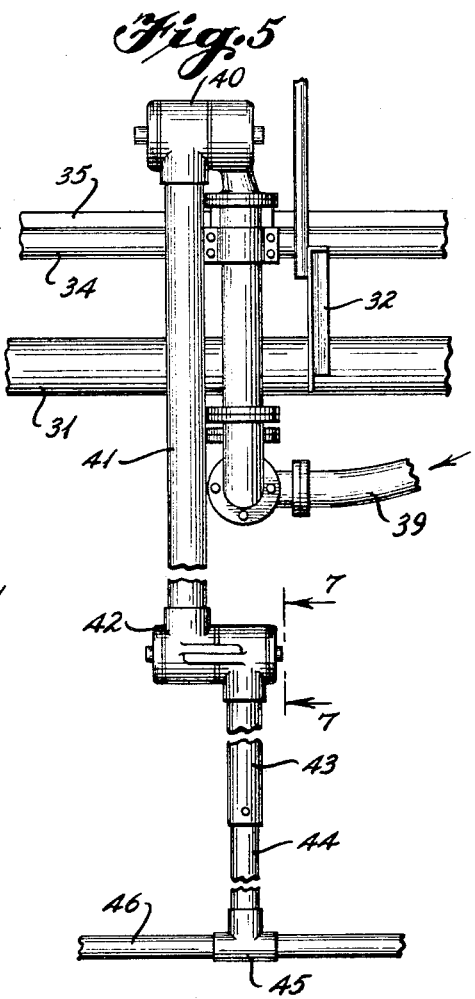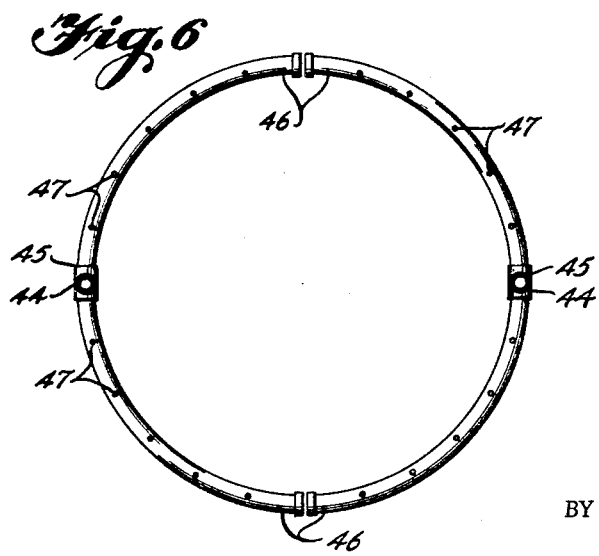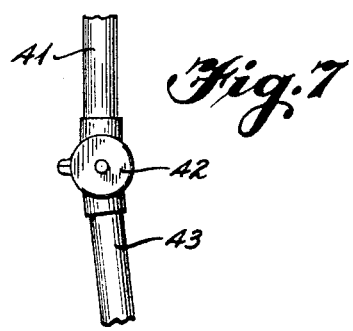

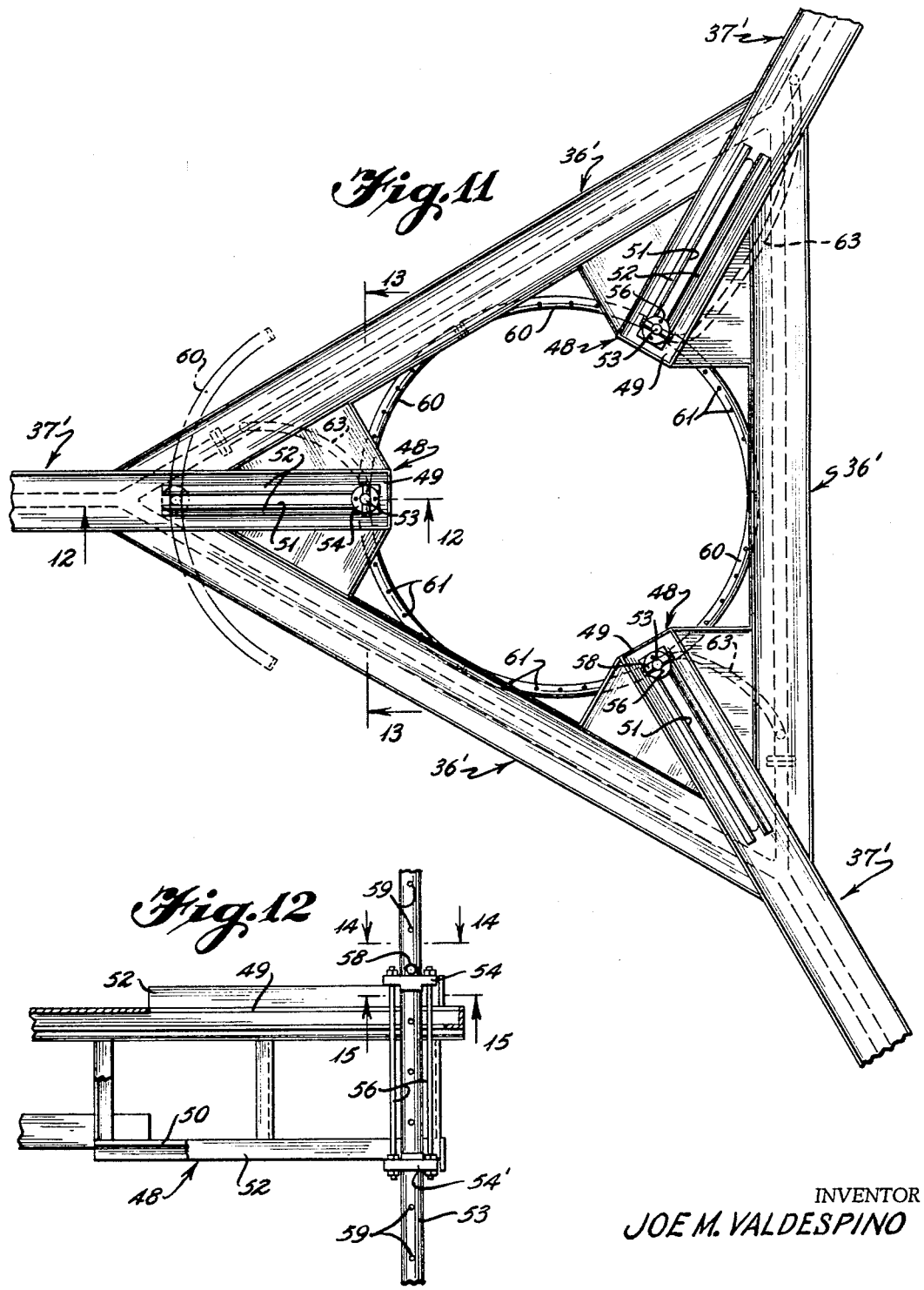

Aug. 20, 1968  J. M. VALDESPINO  3,397,789
SEWAGE TREATMENT SYSTEM
Original Filed Nov. 8, 1963  5 Sheets-Sheet 5
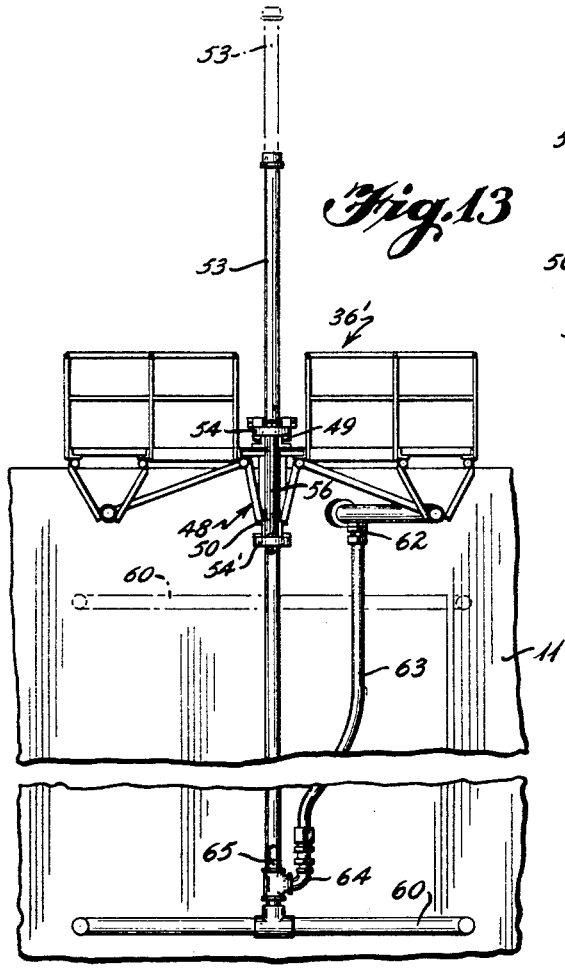
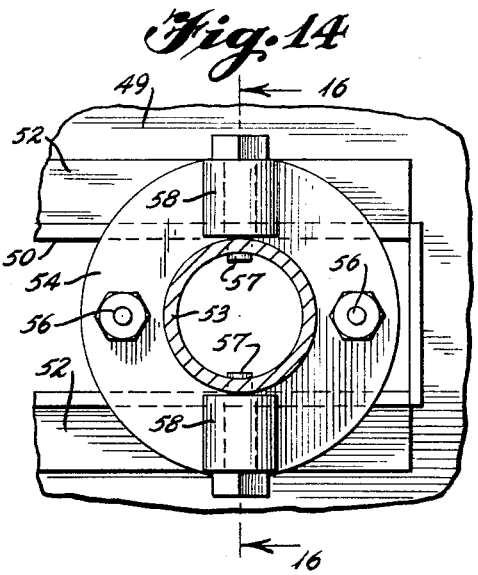
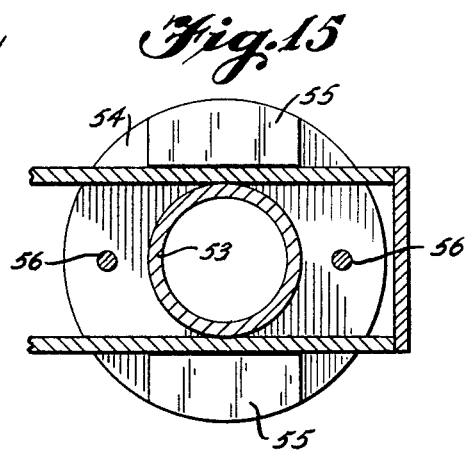
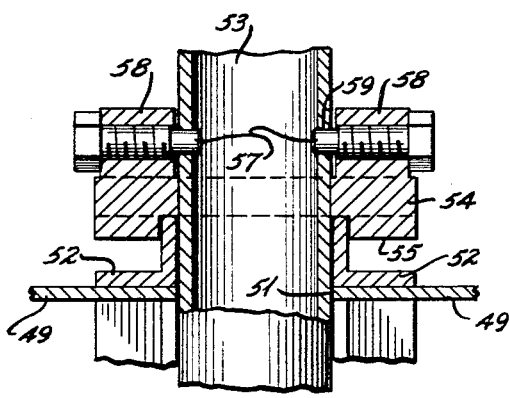
INVENTOR
JOE M. VALDESPINO
BY
ATTORNEY United States Patent Office 3,397,789
Patented Aug. 20, 1968

3,397,789
SEWAGE TREATMENT SYSTEM
Joe M. Valdespino, Orlando, Fla., assignor to Pacific Flush Tank Company, Chicago, Ill., a corporation of Illinois
Continuation of application Ser. No. 322,295, Nov. 8, 1963. This application Oct. 20, 1966, Ser. No. 588,220
7 Claims. (Cl. 210—201)

ABSTRACT OF THE DISCLOSURE

A sewage treatment system includes a plurality of serially connected treating tanks with the first tank providing grit and floatable separation, the second tank providing aeration of the sewage, and a third tank providing an activated sludge digester with feedback of a portion of the sludge from the digester to the second tank with no feedback being provided to the first tank.

---

Figure 1:
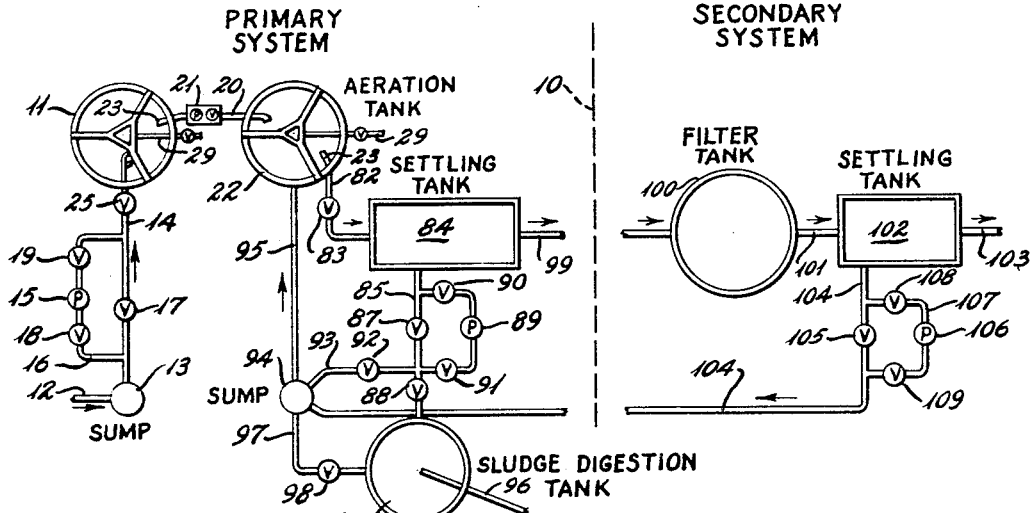

This application is a continuation of my prior copending case, Ser. No. 322,295, filed Nov. 8, 1963, and now abandoned.

This invention relates to the treatment of sewage and involves the removal of separable suspended dissolved and finely dispersed matter, the treatment being designed to remove organic matter and to obtain the benefits thereof including the elimination of nuisance odors, color, turbidity and the like, as well as the simplification of the process of rendering harmless or disinfecting disease bacteria where such is desirable or necessary.

The invention relates particularly to a sewage treatment system of multiple units which collectively remove pollutional material successively in steps and also relates to the character of a particular unit in which aeration is accomplished for converting complex organic compounds and the like to less objectionable character and which more readily may be removed from the liquid in which they are contained.

This application is an addition to that filed by me June 7, 1963, Ser. No. 286,384, now U.S. Patent 3,220,706 and before which it was customary to separate the steps of grit removal, preaeration of septic raw sewage sedimentation and aeration. My above identified application relates to a structure and operating procedure combining the above mentioned steps in one unit thereby increasing efficiency. The present invention simplifies and improves the aeration tank which in itself improves the operation of the system. In the aeration tank of my prior application sewage was introduced through tangential nozzles near the circumference of the tank in a manner to produce a swirling action and a pump was added in fixed position exteriorly of the tank to assist in the production of the swirling action. Also grit accumulated in the bottom of the tank at the center was supposed to be removed through an outlet pipe and air for aeration purposes was introduced centrally downwardly in the tank so that substantial amounts of grit accumulated frequently in excess of that which could be conveniently removed.

It is an object of the invention to provide a sewage treatment system including an aeration tank of relatively small size and reasonable cost, but of improved flexibility and efficiency, and by means of which raw sewage can be treated in a manner to reduce its organic contents to substantial negligible value in a minimum of time, as well as to accommodate fluctuation in the volume treated while providing for constant discharge to insure desirable uniform subsequent flow through succeeding units of the system.

Another object of the invention is to provide an aeration tank of the character indicated which can be added to a system such as that of my prior application above identified with the present invention serving as a first unit in series with the aeration tank of that system and with return to the aeration tank of the above identified earlier filed application, or where it is desired to use only one aeration tank the aeration tank of the present invention can be substituted for the aeration tank of that or other system.

Another object of the invention is to introduce sewage into the aeration tank near the center or other location through one or more discharge pipes with a nozzle which can be angularly adjusted and with at least one pump located near the inner wall of the tank for selective elevational adjustment below the liquid level or to a position above the liquid level where it can be serviced without interruption of the operation of the system, and by means of such pump or pumps the swirling flow within the system can be greatly accelerated and such pump having an angularly adjustable discharge nozzle by the adjustment of which a change in the direction and effect of the matter discharged may be effected.

Another object of the invention is to provide an access walkway and supporting truss above the tank including a hollow central frame of triangular or other desired construction which allows unobstructed access through the center of the tank to the bottom where grit collects to allow the ready removal of excess grit, such hollow central frame being provided with supporting legs which rest upon the top of the tank approximately four feet above the normal liquid level and form a support for the ring through which air is admitted, as well as for other structure.

Another object of the invention is to provide a split ring type air supply supported from the access walkway and supporting truss and having means for adjusting the position of such split ring, both horizontally and transversely, and means for elevating the split ring from an operative position beneath the liquid level in the tank to position above such level for accessibility.

A still further object of the invention is to provide an aeration tank which provides a more complete washing action in the nondigestible grit through the combination of the adjustable air supply and the spiral action of the fluid within the tank to make the grit and the fluid more amenable to further treatment.

Figure 2:
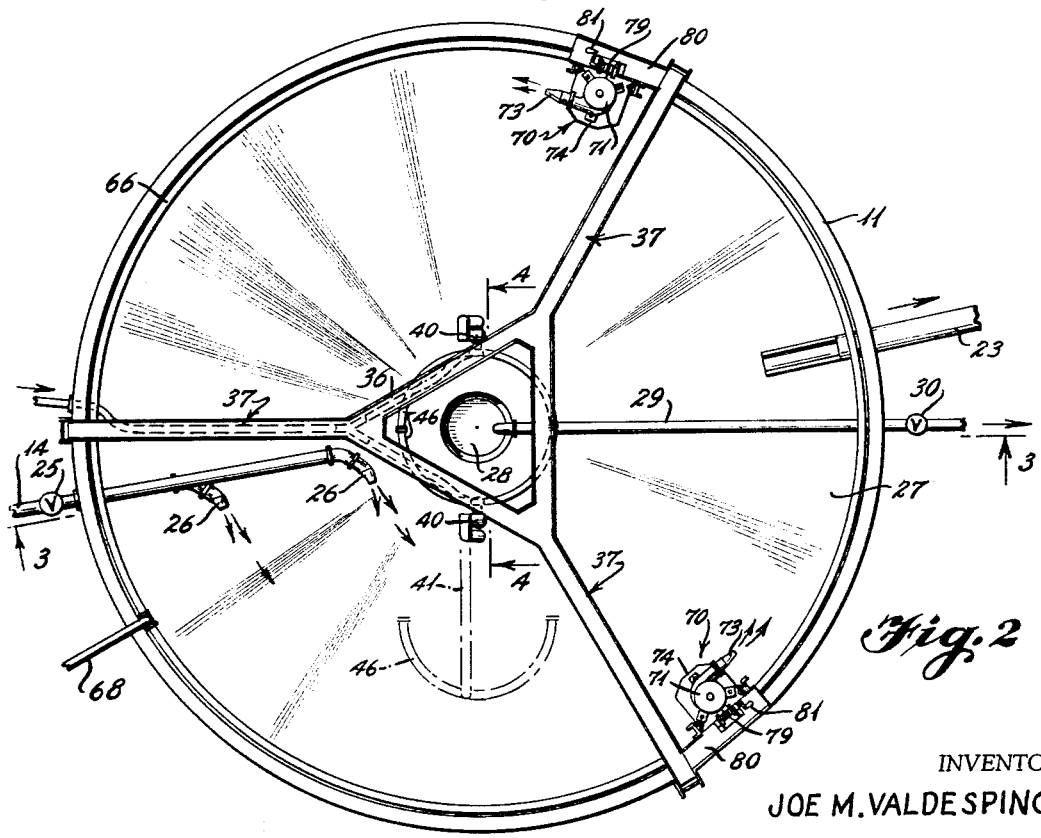

Other objects and advantages of the invention will be apparent from the following description taken in conjunction with the accompanying drawings in which:

FIG. 1 is a diagrammatic view or layout of a sewage disposal system in accordance with the present invention;

FIG. 2, a top plan view of the areation tank;

FIG. 3, a vertical section along the line 3—3 of FIG. 2;

FIG. 4, an enlarged vertical section along the line 4—4 of FIG. 2;

FIG. 5, an enlarged fragmentary side elevation of the structure of FIG. 4;

FIG. 6, a section along the line 6—6 of FIG. 4;

FIG. 7, a fragmentary side elevation of the lower rotary joint along the line 7—7 of FIG. 5;

FIG. 8, an enlarged section along the line 8—8 of FIG. 3;

FIG. 9, a side elevation of the structure of FIG. 8;

FIG. 10, an enlarged fragmentary detail perspective of one end of the catwalk;

FIG. 11, a fragmentary plan view of the central portion of a modified catwalk;

FIG. 12, a section along the line 12—12 of FIG. 11;

FIG. 13, a vertical section along the line 13—13 of FIG. 11;

FIG. 14, an enlarged fragmentary vertical section along the line 14—14 of FIG. 12;

FIG. 15, an enlarged fragmentary section along the line 15—15 of FIG. 12; and

FIG. 16, a fragmentary section along the line 16—16 of FIG. 14.

Briefly stated the invention is a sewage treatment system including an aeration tank which combines preaeration, aeration, sedimentation and grit removal in a single unit and as in my above identified earlier filed application is designed to improve the operation of the entire system and be used with the system of my prior application to provide a one-two operation or to be substituted for the areation tank of such system. The aeration tank contains a plurality of sewage inlets terminating in various locations in the tank with each inlet having an angularly adjustable nozzle to vary the direction of discharge and with an overflow at a remote point from the upper portion of the tank while at the interior surfaces of the tank is mounted one or more pumps which assist and in fact carry the burden of the swirling flow within the tank. The pumps are usable individually or collectively as desired and each has an angularly adjustable discharge nozzle for controlling the direction of the discharge. The bottom of the tank is inclined and provided with the usual discharge pipe for removing accumulation and an access walkway and supporting truss is mounted upon the upper edge of the tank and comprises a central hollow frame within which access can be had therebelow and to the bottom of the tank, such walkway and supporting trust being disposed above the normal liquid level to provide a support for air supply mechanism including an air ring which may be continuous or of multiple sections mounted in such a manner that they can be adjusted to vary the size of the ring or swung upwardly above the liquid level. Through this air ring and the central hollow frame of the walkway truss, grit accumulated at the bottom of the tank in excess of that which can be removed by the discharge line, can be readily scooped upwardly through the center of the tank. A water spray may be provided around the upper inner surface of the aeration tank for reducing foaming and the concentration of alkylbenzenesulfonate.

With continued reference to the drawings, the invention comprises primary and secondary systems which, as illustrated in FIG. 1, are separated by a dash line 10 ahead of which primary system is an aeration tank 11 which receives sewage through a line 12, a sump 13 and a supply line 14 with or without the assistance of a pump 15 and an auxiliary line 16, the supply line 14 being provided with a valve 17 which can be closed to cause flow through the line 16 and in like manner the auxiliary line 16 can be provided with a valve 18 ahead of the pump and a valve 19 beyond the pump to segregate the pump from the sewage lines Partially treated sewage under proper head, either gravity or by a pump or other means, is transferred through a line 20 controlled by a valve 21 into an aeration tank 22 of my prior application.

The parts described thus far contain the principal novel features of the aeration tank contemplated for use in addition to the system including the aeration tank of the above identified prior application which is included herein by reference. It is to be understood that if preferred the aeration tank 11 of the present invention may be substituted for the aeration tank 22 of the above described prior application and thus only a single aeration tank is utilized.

This aeration tank 11 may be of any desired material and of a desired diameter and height in which the liquid level will be a predetermined distance below the upper edge of the tank. Sewage admitted through the line 14 may be controlled by one or more valves 25 and may have one or more angularly adjustable discharge nozzles 26 terminating in various locations with respect to the inner periphery of the tank, while discharge from the tank is through an overflow 23.

The tank has an inclined bottom 27 terminating in a sump 28 from which collected grit and other matter is adapted to be removed through a discharge line 29 controlled by the valve 30.

A walkway is provided which rests on the top of the tank 11 and includes a lower chord 31 connected by the braces 32 and 33 to a pair of upper tube members or chords 34 on which a grating 35 is mounted. The walkway includes a central frame 36 which affords access to the center of the tank including the sump 28 about which grit accumulates and when such grit is deposited in a position remote from the line 29 direct scooping or other grit removal can be accomplished through the frame 36. The central frame 36 is generally triangular as illustrated in FIG. 2 and is supported by arm 37 extending radially from each apex of the central frame to the top of the tank.

In order to provide the necessary aeration within the tank, air under pressure is introduced into an air ring which may be continuous or of multiple segments and normally is located below the liquid level. As illustrated, air is introduced through an air line 38 connected at one end to a source of air under pressure and such air line is supported from the lower chord 31 along one of the arms 37 and extends inwardly to the central frame 36. The inner end of the air line 38 is connected by lines 39 to a pair of swivel couplings or rotary joints and valve assemblies 40 mounted on the central frame 36. Each of the swivel couplings has a pipe 41 which extends downwardly to a lower rotary joint 42 and such joint has a downwardly depending pipe 43 in which a pipe 44 is telescopically received. The free end of the pipe 44 is provided with a leveling connection 45 in which a semicircular ring segment 46 is attached. Each of the ring segments 46 has a plurality of openings 47 which permit air under pressure to escape to aerate the liquid within the tank. As illustrated in FIG. 4 the upper rotary joint may be rotated substantially 180° and such rotation will cut off the supply of air to the ring segment carried by the leveling connection 45. When the upper joint is being rotated the lower rotary joint likewise will rotate to cause the ring segment to be raised to a position overlying the central frame 36 for maintenance thereof. The ring segment 46 may form a substantially closed ring as illustrated in FIGS. 4 and 6 or may be split apart slightly through partial rotation of the upper joint 40.

In FIGS. 11–16 a modified form of walkway and aerating mechanism is illustrated and includes a central frame 36' having an arm 37' extending radially from each apex of the central frame 36' to the rim of the tank 11. Multiple frames 48 extend inwardly of the central frame 36', one frame being substantially coextensive with each of the arms 37' and each frame includes upper and lower plates 49 and 50 attached to the upper and lower chords 34 and 31, respectively. Each of the plates 49 and 50 has a slot 51 with a pair of brackets 52 disposed along the opposite sides of each. A hanger pipe 53 is adjustably mounted within the slots 51 by means of upper and lower guide plates 54 and 54' having guides 55 adapted to overlie the sides of the brackets 52 and prevent rotation of the guide plates 54. In order to fix the hanger pipe 53 in adjusted position, the guide plates 54 are connected by bolts 56 which can be loosened to permit sliding movement of the pipe 53 along the brackets or tightened to secure such pipe in fixed position. The hanger pipe 53 may be adjusted up and down in any desired manner and retained in adjusted position by means of a pair of detents 57 carried in lugs 58 on the upper guide plate 54. Such detents are received within spaced openings 59 in the upper portion of the hanger pipe 53 spaced apart in substantially equal increments so that the hangar pipe may be moved vertically and secured in adjusted position.

An air ring segment 60 is mounted on the lower end of each of the hangar pipes 53 and such ring segments have a plurality of apertures 61 through which air is introduced into material within the tank. As illustrated in FIG. 11 the hangar pipes may be toward the center of the central frame 36' in which position the ring segments will form substantially a closed ring or the hangar pipes may be moved outwardly when desired to form an interrupted ring and thereby change the position of the air being introduced.

In order to provide air to the ring segments, the lower chord 31 may be connected to a source of air under pressure and provided with an outlet 62 adjacent to each of the frames 48. A flexible hose 63 is connected to the outlet 62 and extends downwardly through the tank and is attached to a hangar pipe connection 64 adjacent to the air ring segment 60. A plug 65 is disposed within the hangar pipe 53 above the connection 64 so that air introduced into the pipe through the connection 64 will be discharged through the air ring segment 60.

A water ring 66 is disposed around the inner periphery of the tank and such ring is adapted to discharge water in the form of sprays 67 which reduce foam created by the swirling action of the liquid and the presence of detergents or the like therein. The water ring is supplied through a line 68 connected to a suitable source. The water ring 66 is supported by brackets 69 carried by the lower chords 31 and if desired a plurality of additional support brackets may be mounted around the inner periphery of the tank.

The impetus of the sewage discharge through the nozzles 26 will cause movement or agitation of the liquid within the tank and in order to supplement this movement and to produce a dynamic or swirling spiral action which accelerates the aeration and decomposition of the contents of the tank, one or more adjustable pumps 70 are provided in spaced locations around the inner periphery of the tank. Each of the pumps includes a motor 71 carried within a waterproof housing and is connected to drive an impeller carried within a housing 72 having an adjustable discharge nozzle 73. The motor and impeller housing are mounted on a platform 74 fixed to a pair of guides 75 which in turn are slidably mounted on rails 76. The impeller housing 72 is spaced from the platform 74 by legs 77 which form a suction shroud to permit the liquid to be drawn into the impeller housing 72 for discharge through the nozzle 73.

The platform 74 is adapted to be raised and lowered by means of a cable 78 carried by a winch 79 mounted on a platform 80 on top of the tank 22 and such winch is adapted to be rotated by an operating handle 81. The pump or pumps 70 may be located at any desired elevation within the tank and if more than one pump is used they may be placed at the same elevation or at different elevations and if desired two of such pumps could be located on the same guide rails and disposed at different elevations.

As stated, it is contemplated that the aeration tank 11 be used as a first unit in a system composed of a series of units, one of which is an aeration tank preferably of the character of the above identified previously filed application and in which system there will be a return into the second tank from certain of the succeeding units of the system.

After the sewage has been treated in the aeration tank 22, such sewage may pass through a discharge line 82 controlled by a valve 83 into a primary settling tank 84. Sludge solids which have settled in the primary settling tank 84 may be discharged through a line 85 to a sludge digestion tank 86 or the sludge may be directed to the aeration tank 22 for reprocessing. The discharge from the settling tank 84 through the line 85 may be controlled either by gravity under the control of valves 87 and 88 or by a pump 89 under the influence of valves 90, 91 and 92. Normally the sludge will be directed by the pump 89 through a line 93 controlled by the valves 90, 91 and 92 into a collecting well or sump 94 from which the sludge is discharged back into the aeration tank 22 through a line 95 for reprocessing. Periodically, the sludge from the settling tank 84 may be pumped into the sludge digestion tank 86 by closing the valve 92 and opening the valve 88 or if desired the sludge may be discharged into the sludge digestion tank by gravity by closing valves 90, 91 and 29 and opening valves 87 and 88. Digested sludge is removed from the tank 86 through a discharge pipe 96 and undigested sludge may be periodically withdrawn from the tank 86 through a line 97 controlled by a valve 98 and discharged into the sump 94.

When a secondary treatment system is provided in addition to the primary system, the effluent or discharge from the primary settling tank 84 will pass through a line 99 into such secondary treatment unit in the form of a filter tank 100 with the effluent leaving such unit through a line 101 and into a final settling tank 102 where any additional solids may settle therein and the effluent may pass out through a line 103.

The settled solids are drawn from the final settling tank 102 through a line 104 subject to a control valve 105 by the action of gravity or, if desired, by a pump 106 in a line 107 subject to control valves 108 and 109. The line 104 carries the secondary sludge to the collecting well or sump 94.

In the operation of the system, raw sewage is introduced into the tank 11 through the line 14 and is subject to control by the valves 25 with the discharge being from the angularly adjustable nozzles 26, one of which preferably is located near the center of the tank and the other of which is located adjacent to the side wall thereof. The nozzles 26 impart a rotary motion to the solids bearing liquid and such rotary motion is augmented by one or more pumps 70 disposed about the periphery of the tank. Air under pressure is introduced into the material within the tank through the air ring segments 46 or 60 and since air tends to rise the combined action of the rotary motion of the liquid and the air will cause a swirling spiral action which causes the solids within the liquid to disintegrate and separate the nondigestible grit from the digestible matter. The grit is washed clean and permitted to settle to the bottom of the tank where it is withdrawn through the discharge line 29. The effluent from the tank 11 may be discharged into a second aeration tank 22 similar in construction to the first tank which further aerates the liquid and separates the digestible and nondigestible particles. Liquid sludge in the tank 22 is discharged through a line 82 into a settling tank 84 where the major portion of the solids still in suspension will sink to the bottom of the tank and be discharged therefrom either into the sludge digestion tank 86 or into the sump 94 which returns such sludge to the tank 22 for further processing. The liquid from the tank 84 is discharged into the secondary system which includes a filter tank 100 and a final settling tank 102. Relatively clear liquid is discharged from the tank 102 through line 103 while any solids which have settled to the bottom of the tank will be withdrawn through the line 104 and returned through the sump 94 to the tank 22 for further processing.

It will be apparent from the foregoing that there is provided a sewage treatment system capable of handling sewage in a most efficient manner, the system being of relatively small cost and one in which aeration is utilized to the greatest advantage with circulation being produced by the inlet nozzles and augmented by one or more pumps mounted for selective elevational location, including above the water level, for service. Also, the structure and arrangement of the air equipment is such that it can be elevationally adjusted beneath the liquid level for service or for greater space in the tank, and at the same time the walkway truss arrangement provides a mounting for the pump and air supply mechanism leaving the center of the tank unoccupied and accessible for the removal of grit which cannot be removed readily by the usual discharge pipe. Further, the water ring which reduces foam carrying a concentration of alkylbenzenesulfonate likewise is carried by the walkway truss mechanism.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A sewage treatment system comprising in combination a series of interconnected treatment units including an aeration unit and additional successive units, said areation unit including a generally circular tank for matter to be treated, having an overflow, a sewage inlet below the overflow and through which matter to be treated may be introduced into said tank, a circulator pump mounted in said tank, means for adjusting the height of said pump from a position below the liquid level to a position thereabove for accessibility without interfering with the operation of the system, a combination walkway and supporting truss mounted on said tank and comprising a hollow central frame affording access therethrough downwardly to the lower central portion of the tank, spaced supporting legs for said walkway and supporting truss, air supply means for admitting air into said tank below the liquid level, said air supply means being mounted on said walkway and supporting truss, and said central frame permitting access to and removal of grit from the lower central portion of said tank.

2. A sewage treatment system according to claim 1, wherein said air supply means further comprises an air ring, and further including means for vertically and adjustably mounting said ring in said tank between a lower position near the bottom of the tank and an upper position above the liquid level.

3. A sewage treatment system according to claim 2, wherein said circulator pump has an angularly adjustable nozzle for imparting motion to the contents of the tank and for varying the direction of such movement.

4. A sewage treatment system according to claim 3, wherein said air ring is constructed of multiple sections, said air ring is mounted on said walkway and supporting truss, and said supporting legs are radially spaced, and further including a liquid spray ring around the upper interior portion of the tank having orifices for the spray of liquid onto the liquid in the tank to reduce foam and the presence therein of alkylbenzenesulfonate.

5. A sewage treatment system according to claim 1, further including a liquid spray ring around the upper interior portion of the tank having orifices for the spray of liquid onto the liquid in the tank to reduce foam and the presence therein of alkylbenzenesulfonate.

6. A sewage treatment system comprising in combination a series of interconnected treatment units including an aeration unit and additional successive units, said aeration unit including a generally circular tank for matter to be treated, having an overflow, a sewage inlet below the overflow and through which matter to be treated may be introduced into said tank, a circular pump mounted at the interior of the wall of said tank, means for adjusting the height of said pump from a position below the liquid level to a position thereabove for accessibility without interfering with the operation of the system, said circulator pump having an angularly adjustable nozzle for imparting motion to the contents of the tank and for varying the direction of such movement, a combination walkway and supporting truss mounted on said tank and comprising a hollow central frame affording access therethrough downwardly to the lower central portion of the tank, spaced supporting legs for said walkway and supporting truss, air supply means for admitting air into said tank below the liquid level, and a liquid spray ring around the upper interior portion of the tank having orifices for the spray of liquid onto the liquid in the tank to reduce foam and the presence therein of alkylbenzenesulfonate, said air supply means and liquid spray ring being mounted on said walkway and supporting truss, and said central frame permitting access to and removal of grit from the lower central portion of said tank.

7. A sewage treatment system comprising in combination a series of interconnected treatment units including an aeration unit and additional successive units, said aeration unit including a generally circular tank for matter to be treated, having an overflow, a sewage inlet below the overflow and through which matter to be treated may be introduced into said tank, a circulator pump mounted at the interior of the wall of said tank, means for adjusting the height of said pump from a position below the liquid level to a position thereabove for accessibility without interfering with the operation of the system, said circulator pump having an angularly adjustable nozzle for imparting motion to the contents of the tank and for varying the direction of such movement, air supply means for admitting air into said tank below the liquid level, and a liquid spray ring around the upper interior portion of the tank having orifices for the spray of liquid onto the liquid in the tank to reduce foam and the presence therein of alkylbenzenesulfonate.

References Cited

UNITED STATES PATENTS

| | | | |
|---|---|---|---|
| 1,696,014 | 12/1928 | Remick | 210—195 |
| 1,893,623 | 1/1933 | Imhoff | 210—195 |
| 2,144,386 | 1/1939 | Nordell | 210—195 X |
| 2,328,655 | 9/1943 | Lannert | 210—220 X |
| 2,394,413 | 2/1946 | Walker | 210—5 X |
| 2,464,707 | 3/1949 | Montgomery et al. | 210—259 X |
| 2,649,412 | 8/1953 | Kivari et al. | 210—197 X |
| 3,028,011 | 4/1962 | McGivern | 210—220 X |
| 3,047,492 | 7/1962 | Gambrel | 210—195 X |
| 3,056,749 | 10/1962 | Griffith | 210—13 X |
| 3,078,999 | 2/1963 | Kelly | 210—14 X |
| 3,093,269 | 6/1963 | Messer | 103—87 X |
| 3,133,878 | 5/1964 | Kober | 210—14 X |
| 3,168,595 | 2/1965 | Kibbee | 210—220 X |
| 3,215,276 | 11/1965 | Lind et al. | 210—220 X |
| 3,220,706 | 11/1965 | Valdespino | 210—220 |

FOREIGN PATENTS 830,531  3/1960 Great Britain.

REUBEN FRIEDMAN, *Primary Examiner.*

J. L. DE CESARE, *Assistant Examiner.*